CRYOGENIC SWITCHING DEVICES UTILIZING MEISSNER EFFECT TO CONTROL SUPERCONDUCTIVITY

Filed Oct. 1, 1958 4 Sheets-Sheet 1

RICHARD JIU
INVENTOR.

BY Robert H. Fraser
ATTORNEY

June 18, 1963 R. JIU 3,094,628

CRYOGENIC SWITCHING DEVICES UTILIZING MEISSNER EFFECT TO CONTROL SUPERCONDUCTIVITY

Filed Oct. 1, 1958 4 Sheets-Sheet 2

RICHARD JIU
INVENTOR.

BY Robert H. Fraser

ATTORNEY

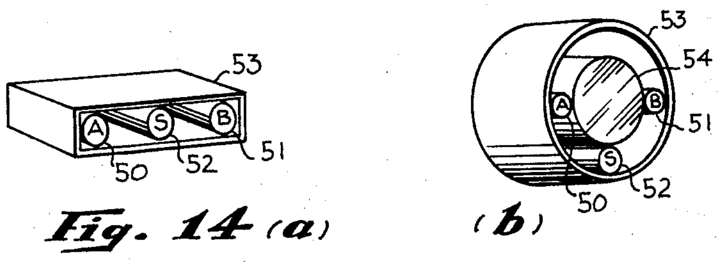
Fig. 14 (a) (b)
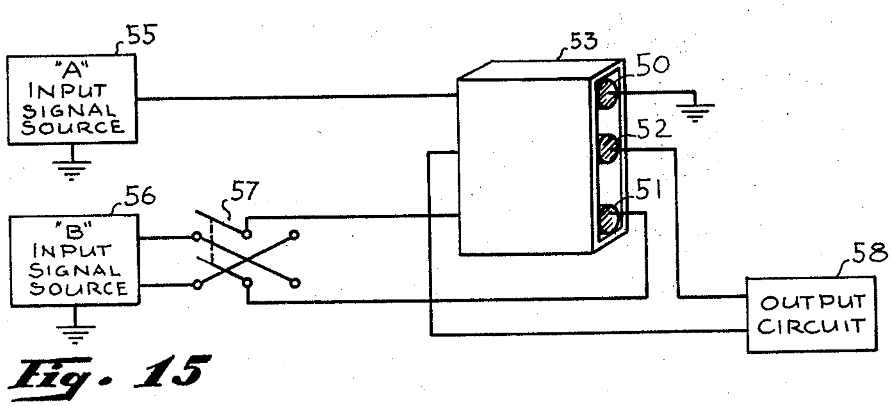
Fig. 15
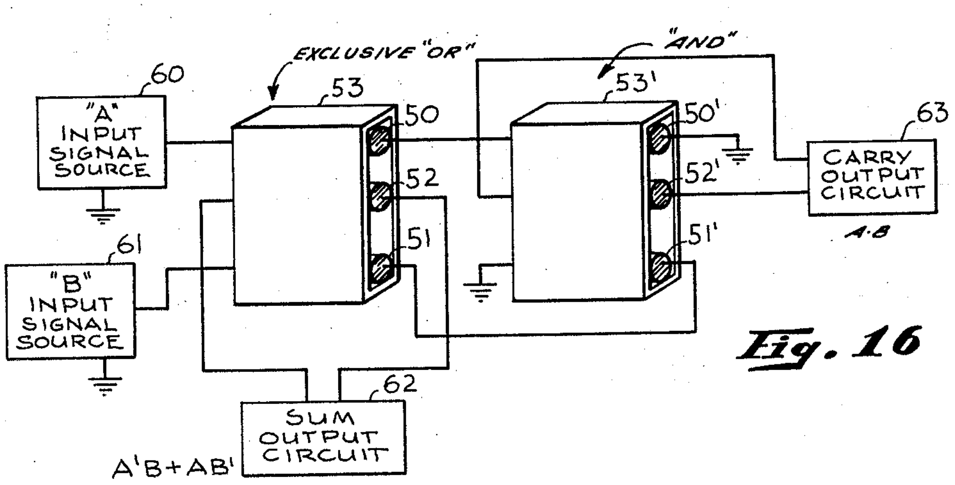
Fig. 16
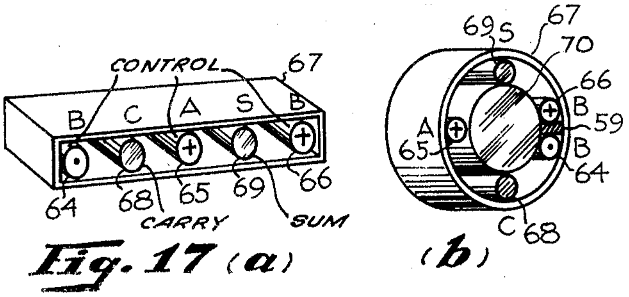
Fig. 17 (a) (b)
RICHARD JIU
INVENTOR.
BY [signature]
ATTORNEY

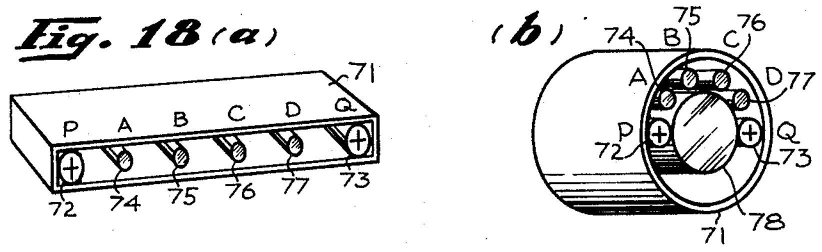
Fig. 18 (a) (b)
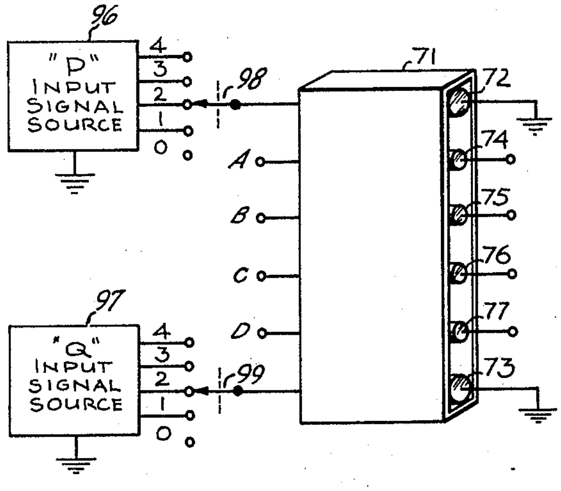
Fig. 19
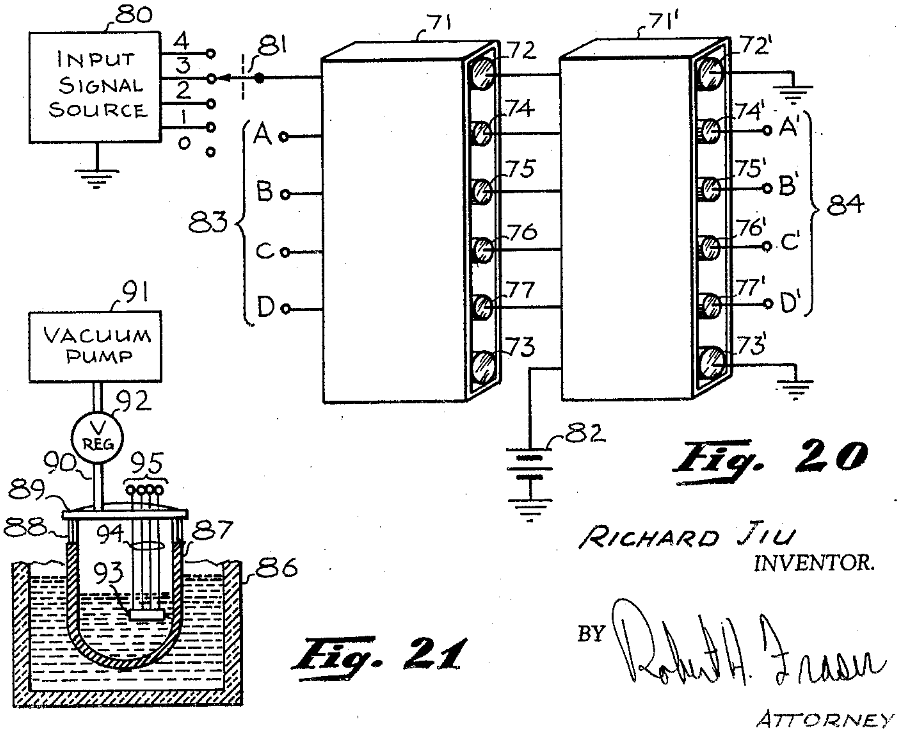
Fig. 20, Fig. 21
RICHARD JIU
INVENTOR.
BY Robert H. Fraser
ATTORNEY

United States Patent Office 3,094,628

Patented June 18, 1963

3,094,628

CRYOGENIC SWITCHING DEVICES UTILIZING MEISSNER EFFECT TO CONTROL SUPERCONDUCTIVITY

Richard Jiu, San Pedro, Calif., assignor, by mesne assignments, to Thompson Ramo Wooldridge Inc., Cleveland, Ohio, a corporation of Ohio Filed Oct. 1, 1958, Ser. No. 764,589

39 Claims. (Cl. 307—88.5)

This invention relates to electrical switching devices utilizing superconductive elements and more particularly to a new and improved electrical switching device in which a superconductor is switched between a superconductive condition and an electrically resistive condition in response to magnetic fields which are controlled by means of magnetically impermeable surfaces exhibiting the Meissner effect.

In the investigation of properties of materials at very low temperatures, it has been found that the electrical resistance of many materials either disappears or drops so low as to be incapable of measurement when the temperature of the material is lowered near absolute zero (0° Kelvin). In a state in which a material exhibits the aforementioned characteristic, the material is said to be superconductive and may be referred to as a superconductor.

The temperature at which a particular material changes from a normally electrically resistive condition to a superconductive condition may be altered by subjecting the material to a magnetic field which may be applied from an external source or may be generated by the flow of current through the superconductive material itself. Electrical circuits employing superconductive elements, i.e. superconductors, have been constructed in which the superconductor is held at a constant temperature and is switched from a superconductive to an electrically resistive condition in response to a magnetic field derived in some instances from an external source, and in other instances from a flow of current through the superconductor itself.

Another phenomenon which is noted in the investigation of the properties of materials at very low temperatures is that when the material is in a superconductive state, it is essentially impermeable to magnetic fields. That is, magnetic fields do not penetrate into superconductive materials to any measurable extent. This phenomenon is known as the Meissner effect. Therefore, when it is said that a given material exhibits the Meissner effect, the material is in a superconductive condition in which it is essentially magnetically impermeable. Of course, as soon as the superconductive condition of a material is extinguished either by a magnetic field or otherwise, the material assumes its normal magnetic characteristic in which magnetic fields penetrate the material to a greater or lesser extent, depending upon its normal degree of magnetic permeability.

Although a great deal of work has been done on the development of superconductive electrical circuit devices in which a superconductor is switched between a superconductive condition and an electrically resistive condition in response to either an externally applied magnetic field or current flowing therethrough, the only known practical use for the materials exhibiting the Meissner effect has been in the shielding of one electrical device from another.

The present invention depends for its operation upon an application of the Meissner effect to enhance and control the magnetic fields generated within an electrical circuit device utilizing superconductive components. Accordingly, it is a primary object of the present invention to provide a new and improved electrical circuit in which a superconductor is switched between a superconductive condition and an electrically resistive condition in response to a magnetic field confined and controlled by surfaces exhibiting the Meissner effect.

It is yet another object of the present invention to provide a new and improved electrical switching circuit having a high efficiency and in which internally generated electrical fields are confined.

It is still another object of the present invention to provide a new and improved electrical switching device including a superconductive barrier which restricts the passage of magnetic fields between a control conductor and a superconductor.

It is a further object of the present invention to provide an electrical switching device in which magnetic fields are confined and controlled to produce a high speed of operation.

Briefly, in accordance with one aspect of the invention, at least one superconductor is surrounded by a magnetically impermeable shell and a magnetic field is generated which is confined by the shell so that the superconductor may be selectively switched from a superconductive condition to an electrically resistive condition. In accordance with another aspect of the invention, a superconductive barrier is disposed between a magnetic field source and a superconductor for restricting the passage of magnetic fields so long as the barrier remains in a superconductive condition.

Although electrical circuits in accordance with the invention are suitable for use in many types of electrical circuits, a particular embodiment of the invention includes a superconductive shell and a superconductive core coaxially arranged to form a pair of magnetic flux paths within which superconductors, control conductors, and superconductive barriers may be arranged to control the passage of magnetic fields in such a way as to enable the device to perform a function in which one or more superconductors are switched between a superconductive condition and an electrically resistive condition in response to currents flowing through the control conductors. Particular arrangements of circuits in accordance with the invention described in detail below include a tristable device, a bistable device, an exclusive "OR" circuit, a conventional or inclusive "OR" circuit, an "AND" circuit, a half-adder, and a commutator.

A better understanding of the invention may be had from a reading of the following detailed description and an inspection of the drawings, in which:

FIG. 14 is a diagrammatic illustration of two equivalent cryogenic switching devices including a pair of control conductors and a superconductor disposed within a superconductive shell;

FIG. 15 is a combined block and schematic circuit diagram of an electrical circuit utilizing a cryogenic switching device of FIG. 14 adapted to perform logical functions;

FIG. 16 is a combined block and schematic circuit diagram of a switching circuit including a pair of cryogenic switching device of FIG. 14 adapted to function as an adder;

FIG. 17 is a diagrammatic illustration of a pair of equivalent cryogenic switching devices in accordance with the invention for use in an adder circuit;

FIG. 18 is a diagrammatic illustration of two equivalent cryogenic switching devices in accordance with the invention including a pair of control conductors and a plurality of superconductors;

FIG. 19 is a combined block and schematic circuit diagram illustrating the manner in which a cryogenic switching dveice of FIG. 18 may be employed as a switching circuit;

FIG. 20 is a combined block and schematic circuit diagram including a pair of cryogenic switching devices of FIG. 18 connected to form a commutating circuit; and FIG. 21 is a diagrammatic illustration of apparatus for maintaining the cryogenic switching devices of the invention at a selected temperature at which the phenomenon of superconductivity occurs.

As noted above, at temperatures near absolute zero, some materials lose all measurable resistance to the flow of electrical current so that a conductor constructed of a material exhibiting the phenomenon assumes a superconductive condition. The temperature at which a change occurs from a normally resistive condition to a superconductive condition is called the transition temperature. For example, the following materials have a transition temperature and become superconductive at the temperatures listed:

| | ° Kelvin |
|---|---|
| Niobium | 8 |
| Lead | 7.2 |
| Vanadium | 5.1 |
| Mercury | 4.12 |
| Tantalum | 4.4 |
| Tin | 3.7 |
| Indium | 3.3 |
| Tellurium | 2.4 |
| Aluminum | 1.2 |

Only a few of the materials exhibiting superconductivity are listed above. Other elements and many alloys and compounds become superconductive at temperatures ranging between 0° and 17° Kelvin. A discussion of many such materials may be found in a book entitled "Superconductivity," by D. Schoenberg, Cambridge University Press, Cambridge, England, 1952.

The above listed transition temperatures apply only where the materials are in a substantially zero magnetic field. In the presence of a magnetic field, the transition temperature is decreased so that a given material may be in an electrically resistive state even for temperatures below the normal transition temperature at which the material would be superconductive in the absence of a magnetic field.

In addition, the above listed transition temperatures apply only for values of electrical current flow which do not exceed a critical value. When a current flows through a material in excess of a critical value, the transition temperature is decreased so that the material is electrically resistive even though the temperature of the material is lower than the normal transition temperature at which the material would otherwise be superconductive. The action of a current in lowering the temperature at which a transition occurs from normal electrical resistivity to superconductivity is similar to the lowering of the transition temperature by a magnetic field for the reason that the current flowing in the material generates a magnetic field having a strength which if externally applied would lead to the same result in lowering the transition temperature.

Accordingly, when a material is held at a temperature below its normal transition temperature for a zero magnetic field, the superconductive condition of the material may be extinguished by application of a magnetic field which may originate in an external source or may be internally generated through the flow of current in the material.

Figure 1:
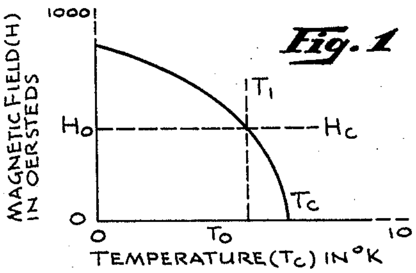
FIG. 1 is a graph of of the transition temperature of a particular superconductive material subjected to a magnetic field.

FIG. 1 illustrates the variation in transition temperature ($T_c$) for a material as a function of an applied magnetic field. In the absence of a magnetic field the point at which the curve intersects the abscissa is the transition temperature at which the material becomes superconductive. For values of temperature and magnetic field falling beneath the curve, the particular material is superconductive while for values of temperature and magnetic field falling above the curve, the material possesses electrical resistance.

The effect of varying the magnetic field applied to a particular material while maintaining the material at a constant temperature lower than the transition temperature is illustrated in FIG. 1 where the dashed line $T_1$ represents a constant temperature line. For a magnetic field ($H_0$) greater than the value ($H_c$) of the point of intersection between the line $T_1$ and the curve, the particular material is electrically resistive. However, for a magnetic field ($H_0$) less than the value ($H_c$) of the point of intersection between the line $T_1$ and the curve, the material is superconductive.

In accordance with the Meissner effect, substantially no electromagnetic field can be developed in a superconductive material while the material is in a superconductive condition. Thus, a superconductive material in a superconductive condition may be said to be magnetically impermeable, which implies that any component of a magnetic field occurring perpendicular to a surface of a superconductive material in a superconductive condition is equal to zero. Accordingly, when a superconductive material is placed adjacent to a current-carrying conductor, the normal magnetic field configuration is distorted.

Figure 2:
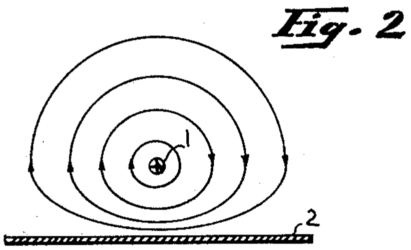
FIG. 2 is a diagrammatic illustration of a current-carrying conductor disposed adjacent a superconductive surface and the resultant magnetic field distribution.

FIG. 2 illustrates a current-carrying conductor 1 disposed adjacent the surface of a superconductive material 2 exhibiting the Meissner effect, along with the resulting configuration of a magnetic field generated by current flow through the conductor 1 into the plane of the drawing.

Throughout the drawings, conventional designations have been employed for the direction of current flow in a current-carrying conductor illustrated in cross-section. Thus, a cross in a circle (⊕) represents a current-carrying conductor in which the direction of current flow is into the plane of the drawing away from the viewer, while a dot in a circle (⊙) represents a current-carrying conductor in which the direction of current flow is out of the plane of the drawing towards the viewer.

Figure 3:
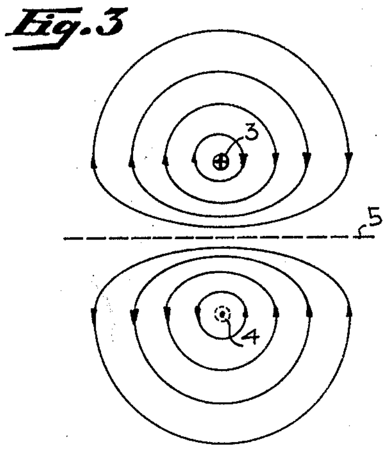
FIG. 3 is a diagrammatic illustration of a current-carrying conductor and an imaginary current-carrying conductor illustrating an effect similar to the presence of a superconductive surface.

The effect of a superconductive material exhibiting the Meissner effect upon the configuration of the magnetic field surrounding a conductor is similar to the effect which would occur if an imaginary conductor carrying an equal and opposite current were present an equal distance on the opposite side of the surface of the superconductive material as in FIG. 3, in which a pair of current-carrying conductors 3 and 4 are positioned on opposite sides of the surface 5 with the magnetic field surrounding the conductors being distorted as illustrated.

Figure 4:
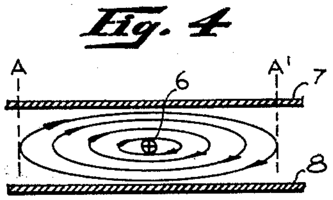
FIG. 4 is a diagrammatic illustration of a current-carrying conductor disposed between two superconductive surfaces and the resultant magnetic field distribution.

The effect of placing a current-carrying conductor 6 between two closely spaced surfaces of superconductive material 7 and 8 exhibiting the Meissner effect is illustrated in FIG. 4 in which the magnetic field configuration surrounding the current-carrying conductor 6 is flattened as compared to its normal concentric configuration. Within the confines of the space between the superconductive materials 7 and 8, the field has a like value at equal distances A and A' on either side of the current-carrying conductor 6.

Figure 5:
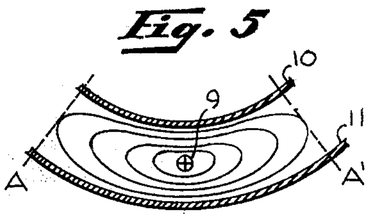
FIG. 5 is a diagrammatic illustration of a current-carrying conductor disposed between two curved superconductive surfaces and the resultant magnetic field distribution.

FIG. 5 illustrates the effect of placing a current-carrying conductor 9 between two curved surfaces of superconductive material 10 and 11 exhibiting the Meissner effect in which it may be seen that the distribution of the magnetic field follows the enclosed region between the curved surfaces with the magnetic field having a like value at equal distances A and A' on either side of the current-carrying conductor 9.

Figure 6:
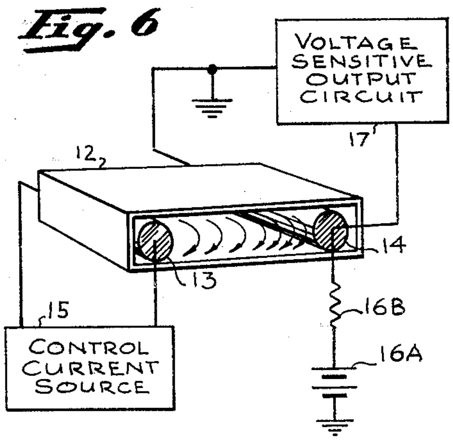
FIG. 6 is a combined block and diagrammatic illustration of a cryogenic switching device in accordance with the invention.

FIG. 6 illustrates an application of the principles described above for the confinement of a magnetic field by means of superconductive materials exhibiting the Meissner effect in which a superconductive shell 12 is disposed around a control conductor 13 and a superconductor 14. The material of the superconductive shell 12 is selected so that the shell remains superconductive at all times at the operating temperature of the device. The material of the control conductor 13 may be either superconductive or normally resistive and is adapted to function as a source of magnetic fields produced in response to current flow therethrough from a control current source 15. The superconductor 14 is constructed of a material which is superconductive at the operating temperature of the device, but which is capable of being switched from a superconductive condition to an electrically resistive condition in response to a magnetic field arising from current flow through the control conductor 13. By virtue of the superconductive shell 12, the magnetic fields surrounding the control conductor 13 are distorted and confined by the shell 12 so as to be more concentrated in the region of the superconductor 14 than when unconfined.

The confinement of the magnetic fields produces a high order of efficiency in operation in which relatively small currents from the control current source 15 are capable of switching the superconductor 14 to an electrically resistive condition. In addition, due to the fact that the control conductor 13 has a relatively low inductance, the rise time for change in current flow through the control conductor 13 is relatively short so that a fast switching operation is achieved.

Although the superconductor 14 may be employed directly in the manner of a conventional switch to control the flow of a current with the superconductive condition corresponding to the closed condition of the switch, and the electrically resistive condition corresponding to an open condition of the switch, an output signal in the form of a voltage may be derived from the device of FIG. 6 by passing a current from a voltage source 16A through the superconductor 14 via a resistor 16B and sensing the appearance of a voltage across the superconductor 14 in an electrically resistive condition by means of a voltage sensitive output circuit 17.

Figure 7:
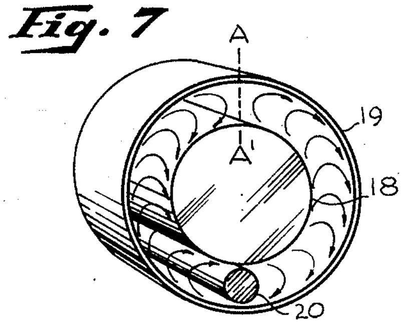
FIG. 7 is a partial perspective view of a current-carrying conductor disposed within a superconductive shell containing a superconductive core.

In accordance with another aspect of the invention, FIG. 7 illustrates a superconductive core 18 exhibiting the Meissner effect, coaxially arranged within a superconductive shell 19. The shell 19 and core 18 cooperate to confine the magnetic fields generated by current flow through a current-carrying conductor 20 to two separate paths which meet in a region about the line, A—A' in which the fields are of opposite polarity and tend to cancel. Since the region of cancellation is an equal distance via each of the two paths from the current-carrying conductor 20, the net magnetic field in the cancellation region is equal to zero.

Figure 8:
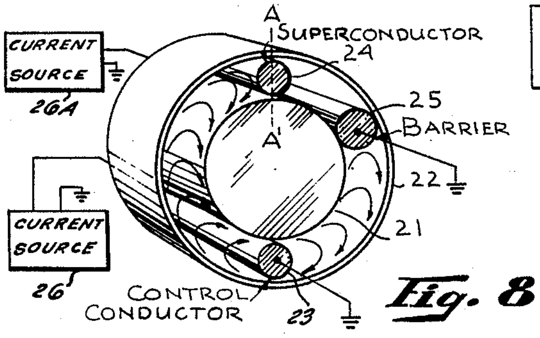
FIG. 8 is a partial perspective view of a cryogenic switching device in accordance with the invention arranged within a superconductive shell containing a superconductive core.

A cryogenic switching device in accordance with the invention utilizing a region in which magnetic fields tend to cancel is illustrated in FIG. 8, in which a superconductive core 21 is disposed coaxially within a superconductive shell 22. Between the core 21 and the shell 22 may be disposed a control conductor 23, a switchable superconductor 24 and a barrier 25 constructed of a superconductive material. The control conductor 23 may be constructed of either a normally resistive or superconductive material, the superconductor 24 is constructed of a superconductive material which is in a superconductive condition at the operating temperature of the device and which is capable of being switched to an electrically resistive condition in response to a magnetic field, and the barrier 25 is constructed of a superconductive material which is superconductive at the operating temperature of the device and which is capable of being rendered electrically resistive in response to an applied magnetic field.

In the arrangement of FIG. 8, the superconductor 24 is disposed within the region in which the magnetic fields generated by current flow through the control conductor 23 are self-cancelling in the absence of the barrier 25. So long as the barrier 25 is in a superconductive condition, the passage of magnetic fields from the control conductor 23 along one of the two paths is restricted since the barrier 25 in a superconductive condition exhibits the Meissner effect.

Therefore, for values of current flow through the control conductor 23 which do not produce a magnetic field sufficiently large to render the barrier 25 electrically resistive, the superconductor 24 is subjected to magnetic fields passed along one path only. By a suitable selection of the materials of the superconductor 24 and the barrier 25 so that the critical field at which the superconductor 24 switches to an electrically resistive condition is substantially lower than the critical field at which the barrier 25 switches to an electrically resistive condition, the superconductor 24 may be switched to an electrically resistive condition in response to magnetic fields which are generated by a current through the control conductor 23, with the magnetic fields at the region of the barrier 25 being insufficient to switch the barrier 25 to an electrically resistive condition. For higher values of current flow through the control conductor 23 which produces a magnetic field in the region of the barrier 25 in excess of the critical value of the barrier 25, the barrier 25 is rendered electrically resistive and magnetic fields from the control conductor 23 are passed through the barrier 25 to the field cancellation region at A—A' in which the superconductor 24 is positioned. The result is that the net magnetic field in the region of the superconductor 24 drops below the critical value of the superconductor 24 so that the superconductor resumes a superconductive condition.

Accordingly, the device of FIG. 8 is capable of three states dependent upon the value of current flow through the control conductor 23. Thus, for relatively low values of current flow through the control conductor 23, both the superconductor 24 and the barrier 25 are in a superconductive condition; for somewhat higher values of current flow through the control conductor 23, the superconductor 24 is rendered electrically resistive by the generated magnetic field, while the barrier 25 remains in a superconductive condition; and for still higher values of current flow through the control conductor 23, the barrier 25 is rendered electrically resistive to allow the passage of magnetic fields to the self-cancellation region of the superconductor 24 to reduce the net magnetic field applied to the superconductor 24, with the result that the superconductor 24 assumes a superconductive condition.

As noted above, when a material is held at a temperature below its normal transition temperature for a zero magnetic field, the superconductive condition of the material may be extinguished by the application of a magnetic field which may originate in an external source or may be internally generated through the flow of current in the material. Accordingly, in the arrangement of FIG. 8, the barrier 25 may receive a current from a suitable source which may operate either alone or in conjunction with the magnetic field produced by current flow through the control conductor 23 to render the barrier 25 electrically resistive. In such an alternative arrangement, the superconductor 24 may be selectively rendered electrically resistive in response to the combined effect of current through the control conductor 23 and the barrier 25.

Figure 9:
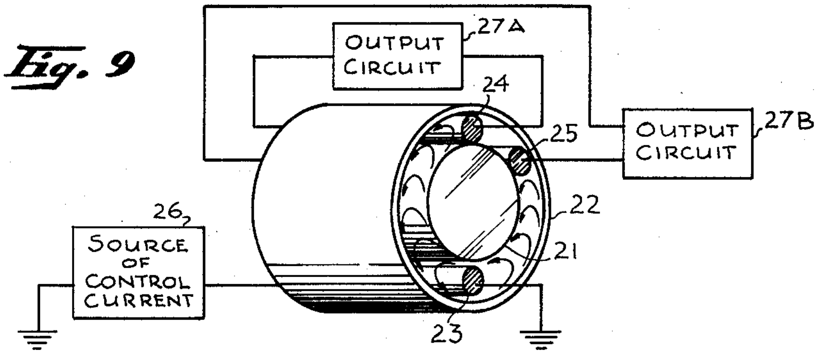
FIG. 9 is a combined block and schematic circuit diagram of a cryogenic switching circuit utilizing the device of FIG. 8.

FIG. 9 illustrates a cryogenic switching device of the type illustrating in FIG. 8 connected in a circuit in which varying currents from a source of control current 26 are passed by a control conductor 23 with separate output circuits 27A and 27B being connected across the superconductive barrier 25 and the superconductor 24.

Figure 10:
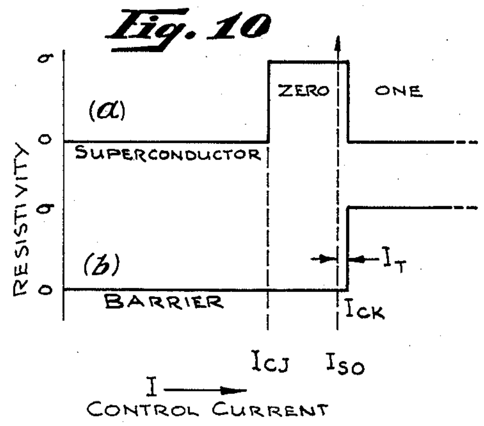
FIG. 10 is a set of graphical illustrations of the resistivity of a superconductor and a superconductive barrier in the cryogenic device of FIGS. 8 and 9 as a function of current flow through the control conductor.

FIG. 10(*a*) illustrates the variation in resistivity of the superconductor 24 as a function of increasing current flow through the control conductor 23. Thus, the resistivity of the superconductor 24 is zero for current flow below a certain value ($I_{CJ}$) and for currents of somewhat higher value the resistivity of the superconductor 24 jumps to a finite value, $\sigma$.

At the same time, FIG. 10(*b*) illustrates the variation in resistivity of the barrier 25 as a function of current flow through the control conductor 23 from which it is seen that the barrier 25 has a resistivity substantially equal to zero for values of control current flow up to a certain value ($I_{CK}$), which is higher than the value ($I_{CJ}$) at which the superconductor 24 assumes a finite value of resistivity. For values of control current flow higher than ($I_{CK}$), the barrier 25 assumes a finite value of electrical resistivity so that magnetic fields produced by the control current pass on both sides of the superconductive core 21 (FIG. 8) to lower the net magnetic field in the region of the superconductor 24 to a level at which the superconductor 24 resumes a zero value of electrical resistivity.

From the graphical illustration of FIG. 10, it is apparent that the device of FIGS. 8 and 9 is capable of three states of operation, dependent upon the value of the control current flowing through the control conductor 23. It is contemplated that the provision of a fast acting, efficient, tri-state circuit device in accordance with the invention will find application in many kinds of logical circuitry utilized in data processing and digital computer systems. Where such systems are operated on binary-coded information, any two of the states of the tri-state device of FIG. 10 may be employed to adapt the device to bistable operation.

In the alternative arrangement described previously in which the condition of conductivity of the barrier is determined by the combined effect of the control current through the control conductor 23 and the current through the barrier 25 itself, the output circuit 27B may comprise a suitable source of electrical current, in which event output signals are derived from the output circuit 27A, reflecting the combined effect of the current flow through the control conductor 23 and the barrier 25. Appropriate current sources 26 and 26A may be connected to the control conductor 23 and the barrier 25 as shown in FIG. 8 to effect operation in the manner just described.

Figure 11:
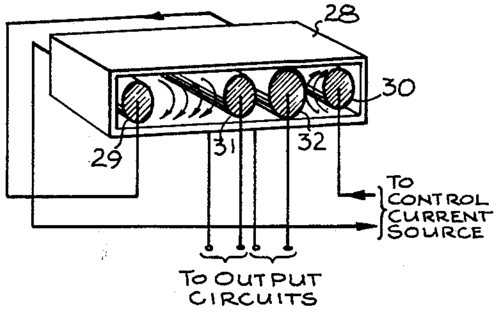
FIG. 11 is a partial perspective view of an alternative configuration of a cryogenic switching device having a function similar to the cryogenic device of FIGS. 8 and 9.

FIG. 11 illustrates an alternative configuration of a cryogenic switching device which is capable of operation in substantially the same manner as the device illustrated in FIG. 8. In FIG. 11 a superconductive shell 28 surrounds a pair of control conductors 29 and 30 disposed on each side of a superconductor 31, with a barrier 32 of superconductive material being positioned between one of the control conductors 30 and the superconductor 31.

In operation, a control current may be passed through the left control conductor 29 and through the right control conductor 30 so as to generate magnetic fields which tend to cancel in a region of the superconductor 31 when the barrier 32 is electrically resistive.

The device of FIG. 11 may be connected in the same circuit configuration as the cryogenic switching device of FIG. 8, by connecting the control conductors 29 and 30 in series to pass a control current through the shell 28. Accordingly, for relatively low values of current flow through the control conductors 29 and 30, both the superconductor 31 and the barrier 32 are in a superconductive condition; for somewhat higher values of control current flow, the superconductor 31 is rendered electrically resistive by the magnetic fields from the control conductor 29 while the barrier 32 restricts the passage of magnetic fields from the right-hand control conductor 30, and for still higher values of control current flow, the barrier 32 is rendered electrically resistive so that magnetic fields are passed to the cancellation region in which the superconductor 31 is located. This reduces the net magnetic field below the critical value at which the material of the superconductor 31 is rendered electrically resistive, with the result that the superconductor 31 resumes a superconductive condition.

From the above consideration of the operation of the configuration of FIG. 11, it is apparent that the graphical illustrations of FIG. 10 are applicable as well to the relationship between the control current through the control conductors 29 and 30 and the resistivity of the superconductor 31 and the barrier 32 of the device of FIG. 11.

Steady-state operation of the devices of FIGS. 8 and 11 in a condition in which either the superconductor or the barrier is electrically resistive may be achieved by passing a bias current through the control conductors. For example, a bias current having a value ($I_{SO}$), as represented by the dashed line in FIG. 10, may be established at a level at which the superconductor is electrically resistive and the barrier is superconductive. Accordingly, a small increase in current ($I_T$) through the control conductor functions to switch the superconductor from an electrically resistive to a superconductive condition, and at the same time, to switch the superconductive barrier from a superconductive condition to an electrically resistive condition. Thus, the conditions of the superconductor and the barrier are reversed in the manner of a conventional bistable circuit having a pair of outputs.

Figure 12:
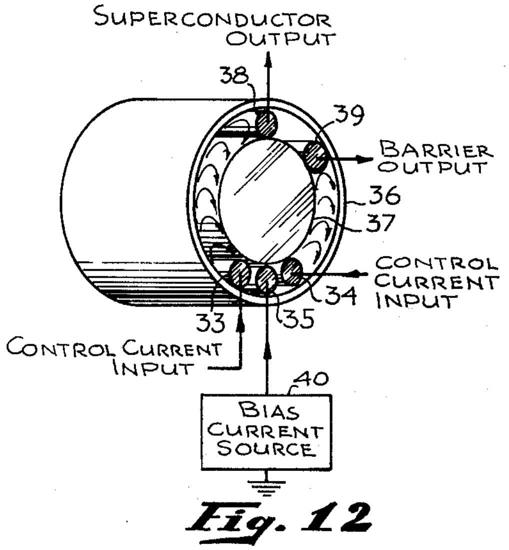
FIG. 12 is a diagrammatic illustration of a cryogenic switching device in a cylindrical configuration including a plurality of control conductors in accordance with the invention.

In addition to the positioning of a barrier of superconductive material between the control conductor and a superconductor in the cryogenic device as illustrated in FIGS. 8, 9 and 11, there may be included additional control conductors through which control currents may be passed to produce magnetic fields within the superconductive shell which are additive or subtractive with respect to magnetic fields produced by current flow in others of the control electrodes. One such arrangement is illustrtaed in FIG. 12 in which a pair of auxiliary control conductors 33 and 34 are positioned on opposite sides of a control conductor 35 within the confines of a superconductive shell 36 disposed around a coaxial superconductive core 37. A superconductor 38 is placed in the field cancellation region and a barrier of superconductive material 39 is disposed in one flux path between the control conductors 33, 34 and 35 and the superconductor 38. By passing currents through the auxiliary control conductors 33 and 34, a magnetic field generated by current flow through the primary control conductor 35 may be altered to selectively render the superconductor 38 and the barrier 39 electrically resistive. For example, if a current ($I_{SO}$) from a bias current source 40 is passed through the control conductor 35 of a value corresponding to that illustrated in FIG. 10, the auxiliary control conductors 33 and 34 may be used as trigger electrodes in which currents are passed through the control conductors to switch the device from a condition in which the superconductor 38 is electrically resistive and the superconductive barrier 39 is in a superconductive condition, to a state in which the superconductor 38 is in a superconductive condition and the superconductive barrier 39 is in an electrically resistive condition. By constructing the auxiliary control conductors 33 and 34 of materials which are electrically resistive at the temperature of operation of the device, the magnetic field surrounding each of the control conductors 33, 34 and 35 is free to pass via the paths on each side of the core 37, with no barrier effect being introduced by the presence of the auxiliary control conductors.

In applications in which a constant, steady-state magnetic field within the device is desired, one or more permanent magnets may be positioned in suitable locations with the magnetic fields generated by current flow through one or more control conductors being oriented to be additive or subtractive with respect to the fields from the magnets. For example, in the device of FIG. 12, a permanent magnet may be substituted for the control conductor 35 for establishing a magnetic field equivalent to the magnetic field generated by a bias current through the control conductor 35.

Figure 13:
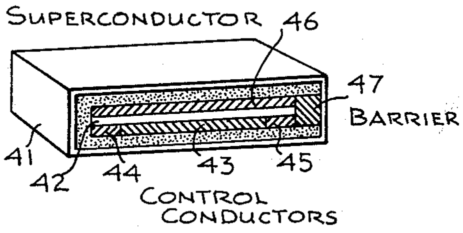
FIG. 13 is a perspective view of a cryognic switching device similar to FIG. 12 illustrating one practical coaxial arrangment of a superconductive core and a superconductive shell along with various control conductors, a superconductor and a superconductive barrier.

For simplicity of explanation and description, the cryogenic switching devices of FIGS. 7–9 and 12 have been displayed in a cylindrical configuration in which a superconductive inner core is coaxially disposed with respect to a cylindrical superconductive shell. Other equivalent arrangements in which a pair of flux paths are provided between a control conductor and a superconductor disposed in a flux-cancellation region may be readily employed in practice. For example, in FIG. 13 an outer superconductive shell 41 of rectangular cross-sectional configuration surrounds a core 42. In the space between the core 42 and the shell 41 may be disposed, for example, a control conductor 43, auxiliary control conductors 44 and 45, a superconductor 46 and a superconductive barrier 47. Spaced between the inner surface of the outer shell 41, and the remainder of the elements of the device may be a filler material with substantially non-magnetic characteristics at the temperature of operation of the device.

Although cryogenic switching devices in accordance with the invention may be employed in many varieties of electrical circuits for controlling the flow of current, it is contemplated that the devices will prove to be particularly useful in the fabrication of data processing systems and digital computers in which logical circuits are utilized to pass a current or generate an output signal in response to the occurrence or concurrence of condition representing currents corresponding to coded digital information.

FIG. 14 illustrates two equivalent arrangements of a cryogenic switching device in accordance with the invention adapted for use in logical circuit arrangements. In the configuration of FIG. 14(*a*) a pair of control conductors 50 and 51 are disposed on each side of a superconductor 52 within a rectangular shell 53 constructed of a superconductive material. The control conductors 50 and 51 may be constructed of either an electrically resistive material or a material which is superconductive at the temperature of operation of the device, while the superconductor 52 is constructed of a material which is superconductive at the temperature of operation of the device and which is capable of being rendered electrically resistive in response to magnetic fields generated by current flow through either of the control conductors 50 and 51, or both. The superconductive shell 53 is constructed of material which is superconductive at the temperature of operation of the device and functions to confine the magnetic fields generated by current flow through the control conductors 50 and 51 in the manner described above.

FIG. 14(*b*) illustrates an arrangement equivalent to the arrangement of FIG. 14(*a*) in a cylindrical configuration in which like reference characters have been utilized to designate parts having a function similar to those of FIG. 14(*a*). Thus, the control conductors 50 and 51 are positioned within the superconductive shell 53, with a superconductor 52 being disposed between the control conductors 50 and 51. A superconductive core 54 cooperates with the superconductive shell 53 to confine the magnetic fields generated by current flow through the control conductors 50 and 51.

FIG. 15 illustrates the manner in which a cryogenic switching device of the type illustrated in FIG. 14 may be employed to perform logical circuit functions. In the circuit of FIG. 15 signals from an "A" input signal source 55 are passed via the control conductor 50 to generate magnetic fields which are applied to the superconductor 52. In a similar fashion, signals from a "B" input signal source 56 are passed via a control conductor 51 to generate magnetic fields which are applied to the superconductor 52. By means of a cross-connected, double pole double throw switch 57, the currents from the "B" input signal source 56 may be passed through the lower control conductor 51 in either direction so that fields may be generated within the shell 53 for application to the superconductor 52 which are either additive or subtractive with respect to the fields generated by current flow from the "A" input signal source 55 through the upper control conductor 50. An output circuit 58 is connected across the superconductor 52 to sense whether the superconductor 52 is in an electrically resistive or a superconductive condition.

With suitable spacing of the control conductors 50 and 51 and the superconductor 52, and a suitable selection of the value of the current flow from the "A" and "B" input signal sources 55 and 56 in its relationship to the material of the superconductor 52, the arrangement of FIG. 15 is capable of selectively switching the superconductor 52 between a superconductive condition and an electrically resistive condition in response to the occurrence or concurrence of signals from the "A" and "B" input signal sources 55 and 56.

The currents from the "A" input signal source 55 and the "B" input signal source 56 may be selected to have a value large enough so that current flow through either of the control conductors 50 and 51 generates a magnetic field sufficiently large to render the superconductor electrically resistive. However, where current flows concurrently in the same direction through both the upper and lower control conductors 50 and 51, a cancellation of magnetic fields occurs in the region of the superconductor 52 which reduces the net magnetic field to a level at which the superconductor resumes a superconductive condition. Thus, the circuit of FIG. 15 may be arranged to perform the functions illustrated in the following table corresponding to the logical equation for an exclusive "OR" circuit, $$A \oplus B = AB' + A'B$$

| A | B | S |
|---|---|---|
| O | O | *s* |
| I | O | *r* |
| O | I | *r* |
| I | I | *s* |

where *s* indicates a superconductive condition of the superconductor and *r* indicates a resistive condition of the superconductor.

The circuit of FIG. 15 may be readily adapted to perform the functions of a logical "AND" circuit or a conventional logical "OR" circuit by placing the switch 57 in the right-hand position in which the current flow from the "A" input signal source 55 passes through the upper control conductor 50 in a direction opposite to the direction in which the current flow from the "B" input signal source 56 passes through the lower control conductor 51.

For "AND" circuit operation, the value of current flow from the "A" and "B" input signal sources 55 and 56, respectively, should be selected in its relationship to the material of the superconductor 52 so that current flow through one of the control conductors, 50 or 51, is insufficient in itself to generate a magnetic field which renders the superconductor 52 electrically resistive. However, since the current flow through the upper control conductor 50 is in a direction opposite to the current flow through the lower conductor 51, magnetic fields generated by current flow therethrough are additive in the region of the superconductor so that whenever a concurrence of signals from the "A" input signal source 55 and the "B" input signal source 56 occurs, the superconductor 52 is rendered electrically resistive. Thus, the circuit of FIG. 15 may be adapted to perform the functions set forth in the following table corresponding to the logical equation for a logical product, $$A \cdot B$$

wherein —I indicates that the direction of current flow through the lower superconductor 51 is opposite to the direction of current flow through the upper superconductor 50.

| A | B | S |
|---|---|---|
| O | O | s |
| I | O | s |
| O | —I | s |
| I | —I | r |

By increasing the value of the current flow from the "A" and "B" input signal sources 55 and 56, with the switch 57 in the right-hand position to reverse the direction of current flow through the lower control conductor 51, the circuit of FIG. 15 may be arranged to function as a conventional "OR" circuit in which the superconductor 52 is rendered electrically resistive whenever current flows from either the "A" input signal source 55 or the "B" input signal source 56. Thus, the circuit of FIG. 15 may be adapted to perform the functions set forth in the following table corresponding to the logical equation, $$A + B$$

| A | B | S |
|---|---|---|
| O | O | s |
| 2I | O | r |
| O | —2I | r |
| 2I | —2I | r |

where the minus sign indicates that the direction of current flow through the lower superconductor 51 is reversed with respect to the direction of current flow through the upper control conductor 50 and the numeral 2 preceding the current I indicates that the value of current flow from the "A" and "B" input signal sources 55 and 56 is individually large enough to generate a magnetic field which renders the superconductor 52 electrically resistive.

In order to perform a logical addition of two binary-coded signals, two of the cryogenic switching devices illustrated in FIG. 14 may be interconnected to form an adder circuit as illustrated in FIG. 16. In FIG. 16 the upper control conductor 50 of the left-hand cryogenic switching device is connected serially with the upper control conductor 50′ of a right-hand cryogenic switching device so that currents from an "A" input signal source 60 are passed through the upper control conductors 50 and 50′ in like direction. In a similar fashion, but with the direction of current flow being opposite with respect to one another, current from a "B" input signal source 61 may be passed through the lower control conductor 51 of the left-hand cryogenic switching device in one direction, and through the lower control conductor 51′ of the right-hand cryogenic switching device in an opposite direction. Thus, in the left-hand cryogenic switching device, currents from the "A" and "B" input signal sources 60 and 61 produce magnetic fields within the shell 53 which are subtractive in the region of the superconductor 52 while in the right-hand cryogenic switching device, current flow through the control conductors 50′ and 51′ produces magnetic fields within the shell 53′ which are additive in the region of the superconductor 52′.

The value of the currents from the "A" and "B" input signal sources 60 and 61 are selected in the adder circuit of FIG. 16 to have a relationship with respect to the critical field values of the materials of the superconductors 52 and 52′ so that the left-hand cryogenic switching device functions as an exclusive "OR" circuit in the manner described above, while the right-hand cryogenic switching device functions as a logical "AND" circuit in the manner described above. Accordingly, a sum output circuit 62 may be connected across the superconductor 52 to sense the condition in which the superconductor 52 is rendered electrically resistive, which occurs in response to current flow from either the "A" or "B" input sources 60 and 61, but not both.

Where input signals are applied from both the "A" and "B" input sources 60 and 61, the right-hand cryogenic switching device renders the superconductor 52′ electrically resistive, which may be sensed by a carry output circuit 63. Accordingly, the circuit of FIG. 16 is capable of functioning as a binary adder circuit in which the output signals from the output circuits 62 and 63 represent the sum of binary signals represented by currents from the "A" and "B" input sources 60 and 61. The functions of the circuit of FIG. 16 are set forth in the following table in which the binary values 0 and 1 correspond to the presence or absence of current flow. The sum superconductor 52 (S) is rendered electrically resistive in accordance with the logical relationship $A'B+AB'$, and the carry superconductor 52′ (C) is rendered electrically resistive in accordance with the logical relationship $A \cdot B$

| A | B | S | C |
|---|---|---|---|
| 0 | 0 | 0 | 0 |
| 0 | 1 | 1 | 0 |
| 1 | 0 | 1 | 0 |
| 1 | 1 | 0 | 1 |

Since the adder circuit of FIG. 16 does not take into account a carry from a previous adder stage, the circuit is referred to as a half adder.

FIG. 17 illustrates two equivalent alternative arrangements of cryogenic switching devices which are specifically adapted to be employed in a half-adder circuit such as that illustrated in FIG. 16. The arrangements of FIG. 17 include three control conductors 64, 65 and 66 arranged within a superconductive shell 67, a first superconductor 68 from which may be derived carry output signals disposed between the control conductors 64 and 65, and a second superconductor 69 from which may be derived half-sum output signals disposed between the control conductors 65 and 66. In addition, in the cylindrical configuration of FIG. 17(*b*) a superconductive core 70 is coaxially arranged within the shell 67 and a superconductive barrier 59 is positioned between the control conductors 64 and 66.

In operation, currents may be passed through the control conductors 64, 65 and 66 in the directions indicated with the carry superconductor 68 functioning in a manner similar to an "AND" circuit to be rendered electrically resistive whenever input currents are passed through both the control conductors 64 and 65. The sum superconductor 69 functions in a manner similar to an exclusive "OR" circuit in which the superconductor 69 is rendered electrically resistive in response to current flowing through either the control conductor 65 or the control conductor 66, but not both. Thus, the cryogenic switching device of FIG. 17 may be connected to the "A" and "B" input sources 60 and 61 of FIG. 16, with a sum output circuit 62 being connected across the superconductor 69 and a carry output circuit 63 being connected across the carry superconductor 68.

In operation, the cryogenic switching devices of FIG. 17 are capable of performing the function set forth above in a manner substantially identical to the circuit of FIG. 16.

FIG. 18 illustrates two equivalent arrangements of a cryogenic switching device in accordance with the invention which is specifically adapted to function in a commutator circuit. The cryogenic switching devices of FIG. 18(*a*) and 18(*b*) include a superconductive shell 71 surrounding a pair of control conductors 72 and 73. Disposed within the superconductive shell 71 between the control conductors 72 and 73 is a plurality of superconductors 74–77 constructed of materials capable of being switched from a superconductive condition to an electrically resistive condition in response to magnetic fields generated by current flow through the control conductors 72 and 73.

As the current flow through the left-hand control conductor 72 is increased, the superconductors 74–77 may be sequentially rendered electrically resistive in response to the increase in magnetic field. Thus, for appropriate discrete levels of current flow through the control conductor 72, any selected number of the superconductors 74–77 may be rendered electrically resistive. In a similar fashion, by commencing at the right-hand end and increasing values of current flow through the control conductor 73, the superconductors 74–77 may each be rendered electrically resistive in turn.

Where currents are passed through the control conductors 72 and 73 in the same direction, magnetic fields are generated within the superconductive shell 71 which tend to cancel. Accordingly, for selected values of current flow through the control conductors 72 and 73, the magnetic fields within the shell 71 established by current flow through the control conductors 72 and 73 may be reduced to a net value at which selected ones of the superconductors, which would otherwise be rendered electrically resistive, resume a superconductive condition. In order for the magnetic fields produced by current flow through one of the control conductors 72 or 73 to reach past a superconductor while in a superconductive condition, sufficient space must be left between the inner surfaces of the shell and the superconductors so as to accommodate the passage of the magnetic field. Otherwise, the superconductor in a superconductive condition would block the passage of the magnetic fields in a manner similar to the superconductive barriers described above due to the Meissner effect.

FIG. 18(*b*) illustrates a cylindrical configuration equivalent to the arrangement of FIG. 18(*a*) in which a superconductive core 78 is enclosed within the superconductive shell 71. Although only four superconductors have been illustrated in the configurations of FIG. 18, it will be appreciated that any desired number may be included.

FIG. 19 illustrates a switching circuit in which a cryogenic switching device of the type illustrated in FIG. 18 is connected to receive currents from a "P" input signal source 96 and a "Q" input signal source 97. Each of the input signal sources 96 and 97 is adapted to provide a plurality of different current values which may be selectively applied to the control conductors 72 and 73 by means of the switches 98 and 99. Accordingly, as described above, by a suitable positioning of the switches 98 and 99, magnetic fields may be generated within the shell 71 of the cryogenic switching device of FIG. 19 which are applied to the superconductors 74, 75, 76 and 77.

The operation of the arrangement of FIG. 19 may best be understood through reference to the following tables which set forth the superconductive condition and electrically resistive condition of each of the superconductors 74–77, identified as A, B, C and D, as a function of varying values of current flow through the control conductors 72 and 73, identified as P and Q.

| | P | Q | A | B | C | D |
|---|---|---|---|---|---|---|
| | 0 | 0 | s | s | s | s |
| | 0 | 1 | s | s | s | r |
| λ | 0 | 2 | s | s | r | r |
| | 0 | 3 | s | r | r | r |
| | 0 | 4 | r | r | r | r |
| | 0 | 0 | s | s | s | s |
| | 1 | 0 | r | s | s | s |
| β | 2 | 0 | r | r | s | s |
| | 3 | 0 | r | r | r | s |
| | 4 | 0 | r | r | r | r |
| | 0 | 4 | r | r | r | r |
| | 1 | 4 | s | r | r | r |
| γ | 2 | 4 | s | s | r | r |
| | 3 | 4 | s | s | s | r |
| | 4 | 4 | s | s | s | s |
| | 0 | 3 | s | r | r | r |
| | 1 | 3 | s | s | r | r |
| δ | 2 | 3 | s | s | s | r |
| | 3 | 3 | s | s | s | s |
| | 4 | 3 | r | s | s | s |
| | 4 | 0 | r | r | r | r |
| | 4 | 1 | r | r | r | s |
| ε | 4 | 2 | r | r | s | s |
| | 4 | 3 | r | s | s | s |
| | 4 | 4 | s | s | s | s |

where *r* indicates an electrically resistive condition and *s* indicates a superconductive condition.

From the above tables it is apparent that any selected number of the superconductors *74–77* may be switched between a superconductive condition and an electrically resistive condition, commencing from either the right or left depending upon the value of current flow from the "P" input signal source 96 and the "Q" input signal source 97 through the control conductors 72 and 73.

Where it is desired to construct a cryogenic switching device in which a single one of a plurality of superconductors is maintained in a superconductive condition corresponding to the closed position of a switch so that the device may be employed as a commutator, a pair of the cryogenic switching devices of FIG. 18 may be interconnected as illustrated in FIG. 20, in which the control conductor 72 of a left-hand device is connected serially with the control conductor 72' of a right-hand device to receive varying values of current flow from an input signal source 80. By positioning a switch 81, varying values of current flow from the input signal source 80 may be passed through the control conductors 72 and 72'.

In the circuit configuration of FIG. 20, no current is passed through the lower control conductor 73 of the left-hand device and a bias current from a suitable source 82 is passed through the lower control conductor 73' of the right-hand device. Where the value of the bias current from the source 82 passing through the control conductor 73' has a value equal to three units corresponding to a value in the above tables which sustains three out of the four control conductors *74'–77'* in an electrically resistive condition, the circuit functions as a commutator in which a superconductive path is established between selected corresponding ones of the terminals 83 and the terminals 84, dependent upon the value of the current passed from the input signal source 80 and the switch 81.

Accordingly, a closed circuit path of substantially zero resistance is provided between one of the terminals 83 and a corresponding one of the terminals 84 which is selected in accordance with the position of the switch 81, so that the device of FIG. 20 is capable of functioning as a commutator in response to the value of current flow through the control conductors 72 and 72'.

The operation of the circuit of FIG. 20 as a commutator is illustrated in the following table in which the current value through the upper control conductors 72 and 72' is indicated as $P_1$ $P_2$, the current value through the lower control conductor 73 is identified as $Q_1$, the bias current value through the lower control conductor 73′ is identified as $Q_2$ and the superconductive and resistive conditions of the circuit paths between the terminals 83 and the terminals 84 are tabulated as A, B, C and D, and A′, B′, C′ and D′, respectively.

| $P_1 P_2$ | $Q_1$ | $Q_2$ | A A′ | B B′ | C C′ | D D′ |
|---|---|---|---|---|---|---|
| 0 | 0 | 3 | s | r | r | r |
| 1 | 0 | 3 | r | s | r | r |
| 2 | 0 | 3 | r | r | s | r |
| 3 | 0 | 3 | r | r | r | s |
| 4 | 0 | 3 | r | r | r | r |

Accordingly, reference to the above table verifies the fact that the interconnection of two cryogenic switching devices in a manner illustrated in FIG. 20 produces a comutator circuit in which the value of the control current flow establishes a superconductive condition via only one of the circuit paths, A—A′ to D—D′, with the highest value of current flow of four units establishing a condition in which all of the circuit paths A—A′, B—B′, C—C′ and D—D′ are electrically resistive. Essentially, the commutator of FIG. 20 and the tables next above are a combination of two cryogenic switching devices operating as illustrated in FIG. 19 having applied thereto currents tabulated above in the tables designated as $\beta$ and $\delta$.

Although the cryogenic switching devices described above have each been illustrated diagrammatically for the purposes of an explanation of the principles of the invention, it will be appreciated that the actual configuration of a superconductive shell, a superconductive core, the control conductors, and the barriers may be differently arranged for many practical utilizations of the invention. Accordingly, the control conductors, the superconductors, and the barriers need not necessarily be of cylindrical configuration. As described above in connection with FIG. 13, the various elements may be of rectangular configuration or may comprise thin evaporated layers of suitable materials which are so oriented within the confines of a superconductive surface to control the configuration of a magnetic field.

For each individual application, the materials of which the elements of the devices are constructed may vary with the selected operating temperature of the device and the requirements for the switching of various of the elements from a superconductive condition to an electrically resistive condition. Thus, a particular material may be selected to have a desired critical magnetic field at which the transition from a superconductive condition to an electrically resistive condition takes place. However, with the above general discussion of the principles of the invention in mind, there should be little difficulty in the selection of appropriate materials from the list of materials given above or from standard references describing the characteristics of superconductive materials. In addition, although the above discussion has been directed to the effect of magnetic fields generated within the confines of a superconductive shell, it is apparent that the principles of the invention may be employed as well in devices in which one or more elements are switched between a superconductive condition and an electrically resistive condition in response to either the flow of current through the element itself, or by virtue of a change in temperature of operation. For example, the blocking action of a barrier described above may be extinguished by current flow through the barrier itself, as well as by means of an applied field generated at another location within the superconductive shell. Also, the magnetic field-confining action of a superconductive shell and a superconductive core may be extinguished by current flow through these elements, through the application of electrical fields from an external source to these elements, or in response to a change in operating temperature of the device.

Where suitable materials have been selected for the construction of one or more cryogenic switching devices in accordance with the invention, and a suitable operating temperature has been selected at which the materials possess the proper characteristics, any number of interconnected circuits operating individually or in conjunction with one another in a complete system may be maintained at a suitable low temperature near absolute zero by means of liquified gases.

FIG. 21 is a diagrammatic illustration of one arrangement for maintaining the cryogenic switching devices of the present invention at a selected temperature at which the phenomenon of superconductivity occurs. In FIG. 21 there is shown an exterior insulated container 86 which is adapted to hold a coolant such as liquid nitrogen. Within the container 86 an inner insulated container 87 is suspended for holding a coolant, such as liquid helium, which maintains the circuits of the invention at the proper operating temperature. The top of the container 87 may be sealed by a sleeve 88 and lid 89 through which a conduit 90 connects the inner chamber with a vacuum pump 91 and a pressure regulation valve 92. The pump 91 functions to lower the atmospheric pressure within the chamber so as to control the temperature of the helium. The pressure regulation valve 92 functions to regulate the pressure within the chamber so that the temperature is held constant. One or more circuits 93 of the invention may be suspended in the liquid helium at the proper operating temperature at which the circuit components are superconducting. Connection to the circuits 93 is made by the lead-in wires 94 which also may be constructed of a superconducting material within the cooled region to minimize resistance. The lead-in wires 94 extend through the lid 89 to the terminals 95.

By means of the invention, cryogenic switching devices may be constructed in which the configuration of magnetic fields generated within the device is controlled in a useful manner. Through the inclusion of superconductive barriers operating in conjunction with one or more magnetic field paths, the passage of a magnetic field to given regions of the device may be selectively opened or blocked. In addition, the invention makes possible many new configurations of cryogenic switching devices in which one or more alternate magnetic field paths are established within the confines of superconductive surfaces exhibiting the Meissner effect so that the magnetic fields may be directed to selected regions and to regions in which they appear in alternate polarity and tend to cancel.

It is intended that the detailed description of a number of cryogenic switching devices and circuits in which such devices may be used be by way of example only of the manner in which the principles of the invention may be utilized to perform a useful task. Accordingly, the invention should be given the full scope of any alternative arrangements and modifications utilizing the magnetic field confining techniques described and claimed herein.

What is claimed is:

1. An electrical switching device including the combination of a superconductive shell enclosing a plurality of volumetrically exclusive elements comprising a superconductor disposed within the shell, said superconductor being constructed of a superconductive material which is capable of being switched between a superconductive condition and an electrically resistive condition in response to a magnetic field, and means for generating a magnetic field within the shell to switch the superconductor between a superconductive condition and an electrically resistive condition.

2. An electrical switching device including the combination of a control conductor which is adapted to generate a magnetic field in response to current flow therethrough, a superconductor constructed of a superconductive material which is capable of being switched between a superconductive condition and an electrically resistive condition in response to a magnetic field, and a superconductive shell disposed around the control conductor and the superconductor to confine the magnetic field produced by the control conductor whereby the superconductor may be selectively rendered electrically resistive in response to current flow through the control conductor, said control conductor and said superconductor being non-coaxially positioned within the shell.

3. An electrical switching device including the combination of a control conductor which is adapted to generate a magnetic field in response to current flow therethrough, a spatially separated superconductor which is capable of being switched between a superconductive condition and an electrically resistive condition in response to a magnetic field, a magnetically impermeable shield disposed around the control conductor and the superconductor to confine the magnetic field generated by the control conductor, and means for passing current through the control conductor to generate a magnetic field for switching the superconductor between a superconductive condition and an electrically resistive condition.

4. An electrical switching device including the combination of a control conductor for generating a magnetic field in response to current flow therethrough, a spatially distinct superconductor capable of being switched between a superconductive condition and an electrically resistive condition in response to a magnetic field, a superconductive shell exhibiting the Meissner effect surrounding the control conductor and the superconductor, and means passing a current through the control conductor whereby a magnetic field is impressed upon the superconductor to switch the superconductor between a superconductive condition and an electrically resistive condition.

5. An electrical switching device including the combination of a magnetically impermeable shell exhibiting the Meissner effect, a control conductor disposed within the shell which is adapted to generate a magnetic field in response to current flow therethrough, a plurality of superconductors disposed within the shell at varying distances from the control conductor, each of said superconductors being constructed of a material which is capable of being switched between a superconductive condition and an electrically resistive condition in response to a magnetic field, and means passing a current through the control conductor for sequentially rendering each of said plurality of superconductors electrically resistive in response to a magnetic field generated by the control conductor.

6. An electrical switching device including the combination of a magnetic field-generating conductor, a superconductor, a magnetically impermeable shell exhibiting the Meissner effect disposed around the magnetic field-generating conductor and the superconductor, a superconductive barrier disposed within the magnetically impermeable shell for inhibiting the passage of magnetic fields from the magnetic field-generating conductor to the superconductor so long as the superconductive barrier is in a superconductive condition, and means for selectively rendering the superconductive barrier electrically resistive to pass magnetic fields from the magnetic field-generating conductor to the superconductor whereby the superconductor may be switched from a superconductive condition to an electrically resistive condition.

7. An electrical switching device including the combination of a magnetically impermeable shell, a superconductor disposed within the shell which is capable of being switched between a superconductive condition and an electrically resistive condition in response to a magnetic field, means for generating a magnetic field disposed within the shell, and a magnetically impermeable barrier positioned between the magnetic field-generating means and the superconductor, said barrier being capable of being rendered magnetically permeable to pass a magnetic field from the magnetic field-generating means to the superconductor.

8. An electrical switching device including the combination of a magnetically impermeable shell exhibiting the Meissner effect, at least one control conductor disposed within the shell for generating magnetic fields in response to current flow therethrough, at least one superconductor disposed within the shell constructed of a material which is capable of being switched between a superconductive condition and an electrically resistive condition in response to a magnetic field, at least one barrier element disposed within the shell exhibiting the Meissner effect and adapted to confine magnetic fields to predetermined regions within the shell, and means for selectively rendering the barrier capable of passing magnetic fields to a region within the shell including at least one superconductor.

9. An electrical switching device including the combination of a magnetically impermeable shell, a superconductor disposed within the shell constructed of a material which is capable of being switched between a superconductive condition and an electrically resistive condition in responsive to a magnetic field, a first magnetic field generating conductor disposed within the shell for generating magnetic fields in response to current flow therethrough, a second magnetic field generating conductor disposed within the shell for generating magnetic fields in response to current flow therethrough, and means for passing currents through the first and second conductors in selected directions whereby the magnetic field generated by the second conductor modifies the configuration of the magnetic field generated by the first conductor whereby the superconductor may be selectively switched between a superconductive condition and an electrically resistive condition in accordance with the currents through the first and second conductors.

10. An electrical switching device including the combination of a magnetically impermeable shell exhibiting the Meissner effect, a control conductor disposed within the shell for generating magnetic fields in response to current flow therethrough, a superconductor disposed within the shell constructed of a material capable of being switched between a superconductive condition and an electrically resistive condition in response to a magnetic field, a barrier disposed within the shell between the control conductor and the superconductor, said barrier being constructed of a superconductive material which blocks the passage of magnetic fields from the control conductor to the superconductor so long as the barrier is in a superconductive condition, and means for selectively rendering the barrier electrically resistive to pass a magnetic field from the control conductor to the superconductor.

11. An electrical switching device in accordance with claim 10 in which the means for rendering the barrier electrically resistive comprises a source of current connected to the control conductor which is adapted to pass a current through the control conductor of a magnitude sufficient to generate a magnetic field which renders the barrier electrically resistive.

12. An electrical switching device in accordance with claim 10 in which the means for rendering the barrier electrically resistive comprises a source of current connected to the barrier which is adapted to pass a current through the barrier of a magnitude sufficient to render the barrier electrically resistive.

13. An electrical switching device including the combination of a magnetically impermeable shell exhibiting the Meissner effect, a superconductor disposed within the shell constructed of a material which is capable of being switched from a superconductive condition to an electrically resistive condition in response to an applied magnetic field, a magnetic field-generating means disposed within the shell and oriented with respect to the superconductor to apply magnetic fields of opposite polarities to the superconductor, a magnetically impermeable barrier disposed within the shell and oriented with respect to the superconductor and the magnetic field-generating means to block the passage of magnetic fields of one polarity from the superconductor, and means controlling the intensity of the field generated by the magnetic field-generating means to selectively render the barrier magnetically permeable whereby the fields from the magnetic field-generating means cancel in the region of the superconductor.

14. An electrical switching device including the combination of a pair of magnetically impermeable members having surfaces oriented with respect to one another to form a confined magnetic field path, a superconductor disposed between the surfaces of the magnetically impermeable members constructed of a material which is capable of being switched between a superconductive condition and an electrically resistive condition in response to an applied magnetic field, and a magnetic field-generating means coextensively disposed between the surfaces of the magnetically impermeable members to produce a magnetic field which follows the magnetic field path to the region of the superconductor for switching the superconductor between a superconductive condition and an electrically resistive condition.

15. An electrical switching device including the combination of a shell constructed of a superconductive material, a core disposed within the shell constructed of superconductive material, said shell and said core being arranged to form the walls of a superconductive chamber surrounding the core, a control conductor disposed within the chamber which is adapted to generate a magnetic field in response to current flow therethrough, a superconductor disposed within the chamber constructed of a material which is capable of being switched between a superconductive condition and an electrically resistive condition in response to a magnetic field, and means for passing a current through the control conductor to render the superconductor electrically resistive in response to the magnetic field which is generated by the control conductor, the control conductor and superconductor being noncoaxially positioned within the chamber.

16. An electrical switching device including the combination of a shell having an inner surface exhibiting the Meissner effect, a core disposed within the shell having an outer surface exhibiting the Meissner effect, said inner surface of the shell and said outer surface of the core being arranged to form a confined path for magnetic fields, a control conductor disposed within the shell adapted to generate a magnetic field in response to current flow therethrough, a superconductor disposed within the shell constructed of a material which is capable of being rendered electrically resistive in response to a magnetic field, said control conductor and said superconductor being so oriented within the shell that magnetic fields from the control conductor follow the confined path to a region in which the magnetic fields tend to cancel, a barrier positioned within the shell between the control conductor and the superconductor constructed of a material which is capable of being magnetically impermeable for magnetic fields below a predetermined critical value, and means passing control currents through the control conductor whereby the superconductor and the barrier may be selectively switched between a superconductive condition and an electrically resistive condition.

17. An electrical switching device including the combination of a shell having an inner surface exhibiting the Meissner effect, a core disposed within the shell having an outer surface exhibiting the Meissner effect, a superconductor disposed between the outer surface of the core and the inner surface of the shell constructed of a material which is capable of being rendered electrically resistive in response to an applied magnetic field, a magnetic field-generating means disposed between the outer surface of the core and the inner surface of the shell in a location in which the outer surface of the core and the inner surface of the shell form two separate magnetic field paths between the magnetic field-generating means and the superconductor, a superconductive barrier disposed between the outer surface of the core and the inner surface of the shell between the magnetic field-generating means and the superconductor along one of said two magnetic field paths, said barrier being adapted to restrict the flow of magnetic fields between the magnetic field-generating means and the superconductor below a critical value of magnetic field appearing at the barrier, and said barrier further being adapted to pass magnetic fields in excess of said predetermined critical value, whereby the superconductor may be selectively switched between a superconductive and an electrically resistive condition in response to the magnetic field provided by the magnetic field-generating means.

18. An electrical switching device including the combination of a pair of magnetically impermeable members having surfaces oriented with respect to one another to form a confined magnetic field path, a superconductor disposed between the surfaces of the magnetically impermeable members constructed of a material which is capable of being switched between a superconductive condition and an electrically resistive condition in response to an applied magnetic field, a magnetic field-generating means disposed between the surfaces of the magnetically impermeable members to produce a magnetic field which follows the confined magnetic field path, and a magnetically impermeable barrier positioned between the magnetic field-generating means and the superconductor for blocking the passage of the magnetic fields below a predetermined critical magnetic field value.

19. An electrical switching device including the combination of a pair of magnetically impermeable members having surfaces oriented with respect to one another to form two separate magnetic field paths, a superconductor disposed between the magnetically impermeable members constructed of a material which is capable of being switched between a superconductive condition and an electrically resistive condition in response to an applied magnetic field, a magnetic field-generating means positioned between the magnetically impermeable members for producing magnetic fields which follow each of said two separate magnetic field paths and meet at the region of the superconductor in mutually opposite directions tending to cancel each other, and a magnetically impermeable barrier positioned between the magnetic field generating means and the superconductor along one of said magnetic field paths adapted to block the passage of the magnetic fields having a value less than a predetermined critical value.

20. An electrical switching device including the combination of a pair of members having surfaces exhibiting the Meissner effect which are oriented with respect to one another to form a confined magnetic field path, a superconductor positioned within the magnetic field path constructed of a material which is capable of being switched between a superconductive condition and an electrically resistive condition, a control conductor mounted within the magnetic field path and adapted to generate electrical fields which reach the superconductor via two separate paths, and a superconductive barrier positioned between the control conductor and the superconductor to restrict the passage of magnetic fields along one magnetic field path so long as the barrier remains superconductive.

21. An electrical switching device including the combination of a cylindrical shell having an inner surface exhibiting the Meissner effect, a core disposed within the cylindrical shell having an outer cylindrical surface exhibiting the Meissner effect, said shell and said core being coaxially disposed to form a magnetic field path surrounding the core, a superconductor mounted within the magnetic field path constructed of a material capable of being switched between a superconductive condition and an electrically resistive condition in response to a magnetic field, a magnetic field-generating means positioned within the magnetic field path with the core being positioned between the superconductor and the magnetic field-generating means so that magnetic fields generated by the magnetic field-generating means pass on each side of the core and tend to cancel in the region of the superconductor, and a superconductive barrier exhibiting the Meissner effect positioned on one side of the core between the superconductor and the magnetic field-generating means for restricting passage of magnetic fields to the superconductor so long as the superconductive barrier remains in a superconductive condition whereby the superconductor is rendered electrically resistive for one given value of magnetic field from the magnetic field-generating means and for a higher value of magnetic field from the magnetic field-generating means the superconductive barrier is rendered electrically resistive to pass magnetic fields which cancel in the region of the superconductor to enable the superconductor to assume a superconductive condition.

22. A tri-state switching device including the combination of a shell having an inner surface which exhibits tht Meissner effect, a core mounted coaxially within the shell having an outer surface exhibiting the Meissner effect, a superconductor disposed between the inner surface of the shell and the outer surface of the core constructed of a material which is capable of being switched between a superconductive condition and an electrically resistive condition, a superconductive barrier positioned adjacent the superconductor between the inner surface of the shell and the outer surface of the core constructed of a material which is capable of being switched between a superconductive condition and an electrically resistive condition, said barrier exhibiting the Meissner effect for values of magnetic field below a predetermined threshold, a control conductor disposed between the inner surface of the shell and the outer surface of the core on a side of the core opposite the superconductor, and means passing control currents through the control conductor for selectively rendering the superconductor and the barrier electrically resistive whereby in one state, corresponding to a first value of current flow through the control conductor, the superconductor and the barrier conductor are in a superconductive condition, in a second state, corresponding to another value of current flow through the control conductor, the superconductor is in an electrically resistive condition and the barrier is in a superconductive condition, and in a third state, corresponding to a third value of current flow through the control conductor, the superconductor is in a superconductive condition and the barrier conductor is in an electrically resistive condition.

23. A tri-state switching device including the combination of a shell having an inner surface which exhibits the Meissner effect, a core mounted coaxially within the shell having an outer surface exhibiting the Meissner effect, a superconductor disposed between the inner surface of the shell and the outer surface of the core constructed of a material which is capable of being switched between a superconductive condition and an electrically resistive condition, a superconductive barrier positioned adjacent the superconductor between the inner surface of the shell and the outer surface of the core constructed of a material which is capable of being switched between a superconductive condition and an electrically resistive condition, said barrier exhibiting the Meissner effect for values of magnetic field below a predetermined threshold, means for establishing a steady state magnetic field within the shell for establishing the superconductor in an electrically resistive condition, a control conductor disposed between the inner surface of the shell and the outer surface of the core, and means passing control currents through the control conductor for selectively causing the barrier to assume a superconductive condition.

24. An electrical switching device in accordance with claim 23 in which said steady-state magnetic field-establishing means comprises a control conductor disposed within the shell and means for passing a bias current through the control conductor.

25. An electrical switching device including the combination of a shell having an inner surface which is impermeable to magnetic fields, a core disposed coaxially with respect to the shell and having an outer surface which is impermeable with respect to magnetic fields, the inner surface of the shell and the outer surface of the core being arranged to form a confined magnetic field path surrounding the core, at least one superconductor disposed in the magnetic field path constructed of a material which is capable of being switched between a superconductive condition and an electrically resistive condition, at least one control conductor mounted within the magnetic field path in a position in which magnetic fields generated by current flow therethrough pass on each side of the core to arrive in the region of the superconductor in polarities which tend to cancel, and at least one superconductive barrier positioned in the magnetic field path between the control conductor and the superconductor constructed of a material which exhibits the Meissner effect for magnetic fields below a predetermined level.

26. An electrical switching device in accordance with claim 25 including a plurality of control conductors mounted within the confined magnetic field path which are adapted to generate magnetic fields in accordance with currents flowing therethrough.

27. An electrical switching device including the combination of an enclosure having an inner surface exhibiting the Meissner effect, a first control conductor disposed within the enclosure adapted to generate a magnetic field in response to current flow therethrough, a second control conductor mounted within the enclosure adapted to generate magnetic fields in response to current flow therethrough, a superconductor mounted within the enclosure between the first and second conductors constructed of a material which is capable of being switched between a superconductive condition and an electrically resistive condition in response to an applied magnetic field from said first and second control conductors, and means passing currents through the first and second control conductors to selectively render the superconductor electrically resistive.

28. An electrical switching device in accordance with claim 27 including means for passing currents through the first control conductor representing a first binary value, means for passing currents through the second control conductor representing a second binary value, said currents flowing through the first and second conductors being in like direction whereby the device functions as an exclusive "OR" circuit in which the superconductor is rendered electrically resistive in response to current flow through either one of the control conductors and remains superconductive in response to current flow through both of the control conductors.

29. An electrical circuit in accordance with claim 27 including means for passing current through the first control conductor in a given direction representing a first binary value, means for passing current through the second control conductor in a direction opposite to current flow through the first control conductor representing a second binary value, and the values of the currents flowing through the first and second conductors being capable of generating magnetic fields which switch the superconductor to an electrically resistive condition only when current flows through both said first and second control conductors whereby the device functions as a logical "AND" circuit which renders the superconductor electrically resistive only when the binary values represented by the currents coincide.

30. An electrical switching device including the combination of a superconductive shell, a superconductor disposed within the shell, said superconductor being constructed of a superconductive material which is capable of being switched between a superconductive condition and an electrically resistive condition in response to a magnetic field, a first magnetic field-generating means positioned within the shell for generating a magnetic field having a first given polarity in the region of the superconductor, and a second magnetic field-generating means disposed within the shell for generating a magnetic field in the region of the superconductor which is subtractive with respect to the polarity of the magnetic field generated by said first magnetic field-generating means.

31. An electrical switching device including the combination of a superconductive shell, a superconductor disposed within the shell, said superconductor being constructed of a superconductive material which is capable of being switched between a superconductive condition and an electrically resistive condition in response to a magnetic field, a first magnetic field-generating means positioned within the shell for generating a magnetic field having a first given polarity in the region of the superconductor, and a second magnetic field-generating means disposed within the shell for generating a magnetic field in the region of the superconductor which is additive with respect to the polarity of the magnetic field generated by said first magnetic field-generating means.

32. An electrical switching device including the combination of a magnetically impermeable shell exhibiting the Meissner effect, at least two control conductors spaced apart within the shell for generating magnetic fields in response to current flow therethrough, a plurality of superconductors positioned within the shell at varying distances between the control conductors, each of said superconductors being constructed of a material which is capable of being switched between a superconductive condition and an electrically resistive condition in response to magnetic fields, and means passing currents through the control conductors for rendering selected ones of said plurality of superconductors electrically resistive in response to the magnetic fields generated by the control conductors.

33. A commutating circuit including the combination of a pair of cryogenic switching devices each of which comprises a superconductive shell surrounding a plurality of superconductors which are capable of being rendered electrically resistive in response to magnetic fields generated within the superconductive shell, each of said superconductors of a first one of the cryogenic switching devices being connected serially with one of the superconductors of the second cryogenic switching device, means establishing a steady-state magnetic field within one of the cryogenic switching devices for sustaining at least one of the superconductors in an electrically resistive condition, and means for establishing magnetic fields of varying intensity in both of the cryogenic switching devices having a polarity which is subtractive with respect to the steady-state magnetic field established in the one cryogenic switching device whereby selected ones of the series-connected superconductors are rendered superconductive.

34. A commutating circuit including the combination of two cryogenic switching devices each of which includes a superconductive shell surrounding a plurality of superconductors, means for sequentially rendering the superconductors of a first one of the cryogenic switching devices electrically resistive, means for rendering the superconductors of a second one of the cryogenic switching devices sequentially superconductive, and means interconnecting superconductors of a first one of the cryogenic switching devices and a second one of the cryogenic switching devices for establishing a superconductive path through selected ones of the superconductors.

35. An electrical switching device comprising a control conductor for generating a magnetic field, magnetic field responsive means positioned in a region remote from the control conductor, and a magnetically impermeable member exhibiting the Meissner effect directing the magnetic field from the control conductor to be concentrated at the field responsive means.

36. An electrical switching device comprising a magnetic field confining shell, a superconductive barrier enclosed within the shell, a superconductor within the shell, magnetic field generating means disposed within the shell on the side of the barrier remote from the superconductor, and means for controlling the state of the barrier in order to determine the magnetic field at the superconductor.

37. An electrical switching device including a superconductive shell enclosing a superconductive barrier element, said barrier element being capable of being switched between a superconductive condition and an electrically resistive condition, a superconductor disposed along one side of the barrier, and means for determining the magnetic field at the superconductor including a control conductor positioned along the barrier remote from the superconductor.

38. An electrical switching device in accordance with claim 37 wherein the field determining means further includes means for controlling the state of the superconductor barrier.

39. An electrical switching device including the combination of a superconductor constructed of a superconductive material which is capable of being switched between a superconductive condition and an electrically resistive condition in response to a magnetic field, magnetic field generating means for controlling the state of the superconductor, and superconductive means enclosing the superconductor and the magnetic field generating means having a surface exhibiting the Meissner effect for controlling the magnetic field applied to the superconductor from the magnetic field generating means.

References Cited in the file of this patent

UNITED STATES PATENTS

| | | |
|---|---|---|
| 2,666,884 | Ericsson et al. | Jan. 19, 1954 |
| 2,936,435 | Buck | May 10, 1960 |
| 2,944,211 | Richards | July 5, 1960 |
| 3,007,057 | Brennemann | Oct. 31, 1961 |

OTHER REFERENCES

"Trapped-Flux Superconducting Memory," by J. W. Crowe, published in IBM Journal, October 1957, pp. 295–302.

"An Analysis of the Operation of a Persistent-Supercurrent Memory Cell," by R. L. Garwin, published in IBM Journal, October 1957, pp. 304–308.